(12) United States Patent
Suzuki

(10) Patent No.: US 11,527,174 B2
(45) Date of Patent: Dec. 13, 2022

(54) SYSTEM TO EVALUATE DIMENSIONS OF PRONUNCIATION QUALITY

(71) Applicant: Pearson Education, Inc., Bloomington, MN (US)

(72) Inventor: Masanori Suzuki, Belmont, CA (US)

(73) Assignee: PEARSON EDUCATION, INC., New York, NY (US)

( * ) Notice: Subject to any disclaimer, the term of this patent is extended or adjusted under 35 U.S.C. 154(b) by 764 days.

(21) Appl. No.: 16/436,622

(22) Filed: Jun. 10, 2019

(65) Prior Publication Data

US 2019/0385480 A1    Dec. 19, 2019

Related U.S. Application Data

(60) Provisional application No. 62/686,418, filed on Jun. 18, 2018.

(51) Int. Cl.
*G10L 15/16*   (2006.01)
*G10L 21/00*   (2013.01)
*G10L 17/18*   (2013.01)
*G09B 19/06*   (2006.01)
*G06N 3/08*    (2006.01)
*G10L 15/30*   (2013.01)
(Continued)

(52) U.S. Cl.
CPC ............. *G09B 19/06* (2013.01); *G06N 3/08* (2013.01); *G10L 15/063* (2013.01); *G10L 15/16* (2013.01); *G10L 15/22* (2013.01); *G10L 15/30* (2013.01)

(58) Field of Classification Search
CPC ......... G10L 19/04; G10L 15/00; G10L 17/18; G10L 17/20; G10L 15/16; G10L 15/26; G10L 21/00
See application file for complete search history.

(56) References Cited

U.S. PATENT DOCUMENTS 9,984,682 B1 *   5/2018   Tao ................. G09B 19/04
10,008,209 B1 *  6/2018   Qian ................ G10L 17/18
(Continued)

FOREIGN PATENT DOCUMENTS

CN     104347071 A   *   2/2015
CN     105741832 A   *   7/2016  ............ G10L 15/01
(Continued)

OTHER PUBLICATIONS

Metallinou et al.; Using Deep Neural Networks to Improve Proficiency Assessment for Children English Language Learners; Sep. 14-18, 2014; Interspeech 2014; pp. 1468-1472 (Year: 2014).*

*Primary Examiner* — Shreyans A Patel
(74) *Attorney, Agent, or Firm* — Quarles & Brady LLP

(57) ABSTRACT

The present invention provides a system for determining a language proficiency of a user in an evaluated language. A machine learning engine may be trained using audio file variables from a plurality of audio files and human generated scores for a comprehensibility, accentedness and intelligibility for each audio file. The system may receive an audio file from a user and determine a plurality of audio file variables from the audio file. The system may apply the audio file variables to the machine learning engine to determine a comprehensibility, an accentedness and an intelligibility score for the user. The system may determine one or more projects and/or classes for the user based on the user's comprehensibility score, accentedness score and/or intelligibility score.

17 Claims, 7 Drawing Sheets

(51) Int. Cl.
*G10L 15/22* (2006.01)
*G10L 15/06* (2013.01)

(56) References Cited

U.S. PATENT DOCUMENTS

| | | | | |
|---|---|---|---|---|
| 2013/0295535 A1* | 11/2013 | Levy | ................... | G09B 17/006 |
| | | | | 434/169 |
| 2015/0079555 A1* | 3/2015 | Alexander | ............... | G09B 7/04 |
| | | | | 434/169 |
| 2021/0366485 A1* | 11/2021 | Krishnamoorthy | ..... | G10L 15/26 |

FOREIGN PATENT DOCUMENTS

| | | | | | |
|---|---|---|---|---|---|
| CN | 105845134 A | * | 8/2016 | ............. | G09B 19/04 |
| CN | 105845134 B | * | 2/2020 | ............. | G09B 19/04 |
| WO | WO-02071390 A1 | * | 9/2002 | ............. | G09B 19/04 |

* cited by examiner

SYSTEM TO EVALUATE DIMENSIONS OF PRONUNCIATION QUALITY

CROSS-REFERENCE TO RELATED APPLICATION(S)

This application claims the benefit of priority from provisional application No. 62/686,418, filed under the same title on Jun. 18, 2019, the entire contents of which is incorporated herein by reference.

FIELD OF THE INVENTION

This disclosure relates to the field of evaluating a fluency of speaker in a given language.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory.

The invention further includes one or more data sets. Each data set comprises a plurality of audio files in the same evaluated language. Each audio file has human ratings or scores for the audio file, such as a comprehensibility score, an accentedness score and an intelligibility score.

An audio file signal analyzer may determine a plurality of audio file variables for each audio file in the data sets. The system may then use the data sets, comprising the audio file variables, comprehensibility score, accentedness score and intelligibility score to train a machine learning engine.

Training the machine learning engine will produce a plurality of weighted values for the neural network for the evaluated language that may be saved and used to evaluate audio files from users in the same evaluated language.

The system may receive from a user client an audio file comprising at least one spoken sentence in an evaluated language from a user. The audio file signal analyzer may determine a plurality of audio file variables for the audio file from the user.

The system may also configure the machine learning engine comprising the neural network with the plurality of weighted values determined from training the machine learning engine with the same language as the evaluated language of the audio file.

The system may apply the audio file variables to the machine learning engine comprising the weighted neural network to generate a comprehensibility score for the audio file, an accentedness score for the audio file, and an intelligibility score for the audio file.

The system may determine a spoken language score for the user based on the comprehensibility score, the accentedness score and the intelligibility score. The spoken language score may represent a language proficiency of the user for the evaluated language based on the audio file.

The system may then determine and recommend one or more projects and/or classes to the user based on the user's comprehensibility score, accentedness score, intelligibility score and/or spoken language score.

The above features and advantages of the present invention will be better understood from the following detailed description taken in conjunction with the accompanying drawings.

DETAILED DESCRIPTION

Figure 1:
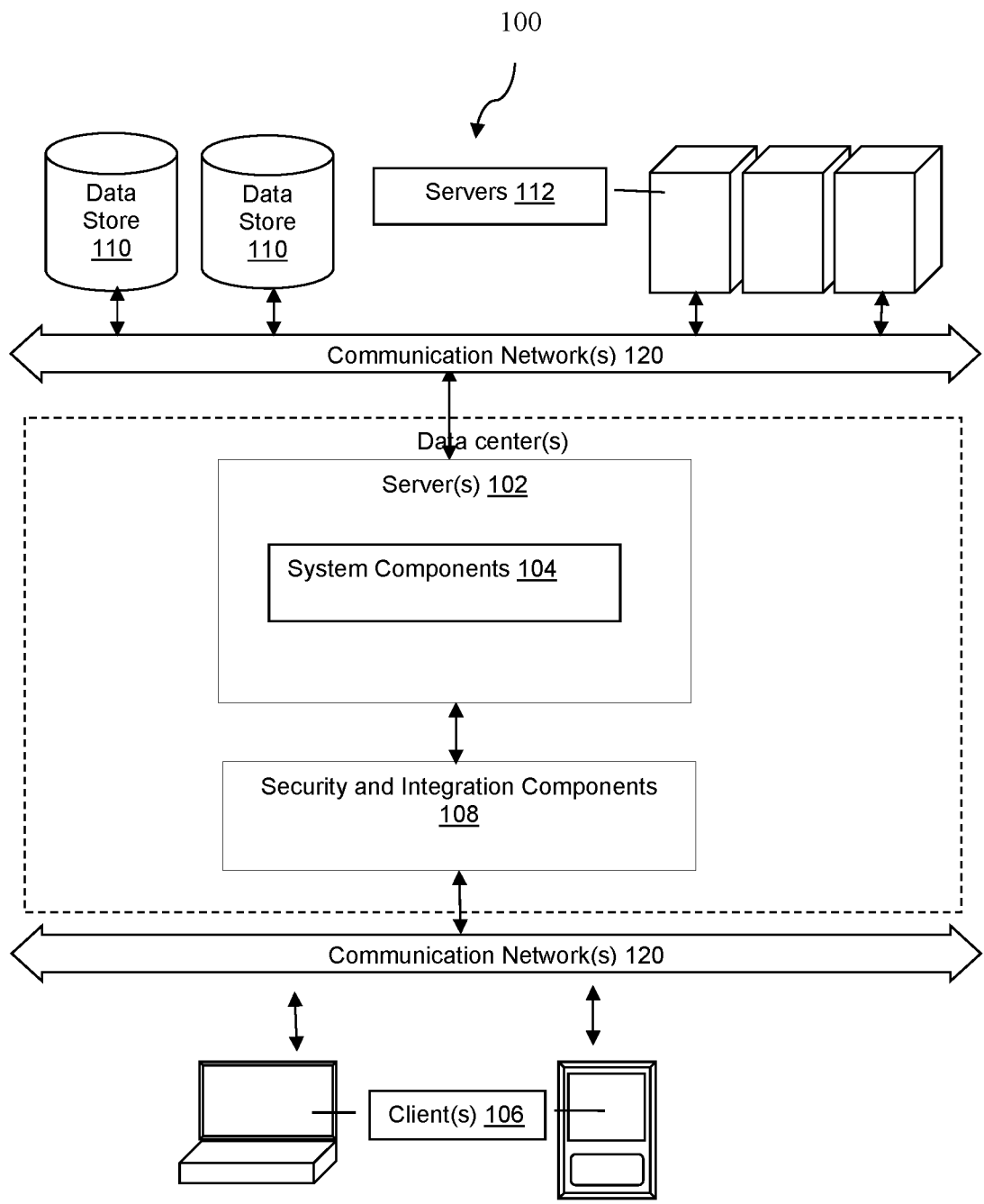
FIG. 1 illustrates a system level block diagram for a non-limiting example of a distributed computing environment that may be used in practicing the invention.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Network

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Servers/Clients

Figure 2:
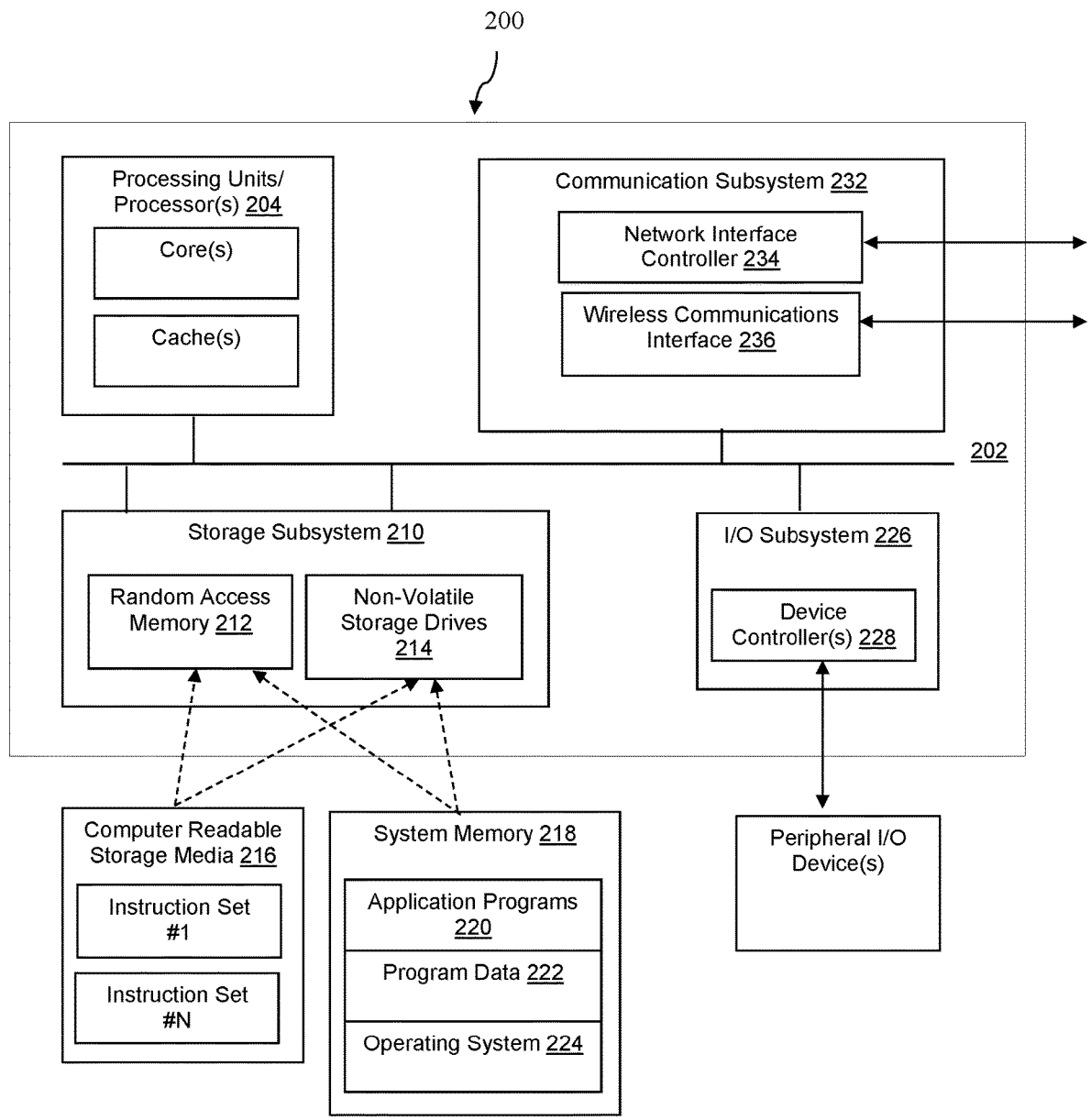
FIG. 2 illustrates a system level block diagram for an illustrative computer system that may be used in practicing the invention.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

Security

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Data Stores (Databases)

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

Computer System

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

Processors

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Buses

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

Input/Output

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

Input

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

Output

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Memory or Storage Media

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Computer Readable Storage Media

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communication Interface

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

Input Output Streams etc.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

Connect Components to System

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

Other Variations

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Methods of Practicing the Invention

Automatic speech recognition (ASR) research and the application of its technology for second language (L2) instruction and assessment have grown considerably in the last two decades. One of the first automated pronunciation evaluation systems was developed to assess the pronunciation quality of Japanese learners of English reading aloud. Since then, numerous applications that incorporate pronunciation tutoring, or computer-assisted pronunciation training (CAPT), have become available commercially; examples include Tell Me More® from Rosetta Stone® and NativeAccent® from Carnegie Speech. In programs such as these, learners are typically asked to read words, phrases, or sentences from a computer screen and the system then identifies incorrectly pronounced phonemes or words. The systems visually points out mispronounced words using signal analysis software, and learners can keep trying those words until their pronunciation aligns with a given target waveform, spectrogram or prosodic contour.

Research shows that these approaches help improve learners' perception and production. Improving pronunciation is typically a very time-consuming endeavor and human teachers may not provide the amount of individual attention and feedback that learners need. The nature of pronunciation learning makes automatic pronunciation scoring a suitable arena for a tireless computer. Furthermore, many L2 learners are self-conscious about their "foreign" accent and may be too shy to receive corrective feedback and practice in the presence of peers. Software tutoring systems can, therefore, provide learners with a flexible and private learning and practice environment.

A different area of application for this technology is the assessment of L2 learner's speaking proficiency. Compared to CAPT systems, there are currently fewer examples of these applications. The SpeechRater™ system from the Educational Testing Service (ETS) is one operational system used to evaluate spontaneous speech by L2 English speakers for the practice test of the Test of English as a Foreign Language™ (TOEFL®). Another example is Versant English Test, formerly known as PhonePass™, which is designed to assess the test taker's facility in spoken English. Pronunciation may be one of four automatically scored subskills (along with three others: Sentence Mastery, Vocabulary, and Vocabulary). The pronunciation score is derived from a series of constrained, performance-based tasks, such as reading sentences, repeating sentences, and retelling stories, as part of estimating overall spoken language proficiency. The pronunciation score may be a measure of the test-taker's pronunciation quality at the test level—that is, how closely the test-taker is able to approximate the articulation of native speakers (or highly proficient non-natives) according to a statistical model based on field test data. Unlike CAPT systems, it is not designed or intended to provide test-takers with feedback on specific diagnostic pronunciation error types; it is used to provide scores as a component of a comprehensive L2 spoken language assessment.

The operationalization and scoring of pronunciation constructs may use ASR systems using constrained tasks. The systems may be developed using how proficient or native reference speakers can be used as a model against which to compare learner pronunciations. The next section illustrates how features of speech are extracted and weighted to score sub-constructs of pronunciation such as word sounds, stress, and intonation. The final section looks ahead to future possible uses of this assessment technology, through the lens of English as an International Language (EIL).

Speech Recognition Modeling

Through an extensive amount of exposure, humans develop the ability to recognize variants of pronunciation as the speaker's intended phonemes, understand the sequence of words, and interpret the meaning of spoken utterances using internalized grammar knowledge. In contrast, software can be "fed" with several hundred hours of speech and associated text transcriptions, and via computational analyses lasting hours or days, the system can be trained to detect patterns and ultimately recognize speech similar to the language it has been trained on. Essentially, the ASR has to process a large variety of voices and speech styles in order to build statistical representations of the segmental properties of different sounds. This section describes the process for developing an automated system for assessing pronunciation, and discusses how the software compares learner speech to norms derived from proficient speakers of the language.

When an automated scoring system is used with ASR technology for assessing pronunciation, broadly speaking, there are four main underlying components to perform the task. These four components, though these processes do not happen in the order of listing, are the acoustic model, the language model, the pronunciation dictionary, and the scoring model. The acoustic model is like a repository of sounds—a probabilistic representation of variations of the sounds, or phones in English (or any other target language of interest for particular pronunciation assessments). The process slices a speech signal into small time frames (e.g., 10 milliseconds), and the model identifies the phonemes that were most likely pronounced in those slices of time. Those phonemes are then parsed into phoneme sequences that match actual words in the language. The word that is identified is the most likely match, often from among several possible options. Arriving at the most probable sequence of words by ASR can be seen as a task of a series of probabilistic estimates, building from small time-frames, to phones, and then to words and word-strings.

The language model represents a sequence of words that the speaker might be expected to say. It is a probability distribution over sequences of words, typically bigrams and trigrams (i.e., sequences of two or three words). For example, in describing a picture of a dining table, "knife and fork" or "salt and pepper" are trigrams that frequently occur in the English language and probably also occur frequently in the speech of learners performing that task. The ASR can be trained to anticipate these words, thereby improving recognition accuracy and the speed of speech recognition, because the search space is dramatically reduced. Language models are frequently constructed for particular items based on some advance data collection that yields a set of frequently produced patterns.

The third component is the pronunciation dictionary, which lists the most common pronunciations of the words in the language model. If certain words (e.g., "schedule") are validly pronounced in more than one way, those different pronunciation variants may be listed for each of those words (e.g., /k/ vs. /sh/ for the "ch" sound in "schedule"), depending on the intended use of the system.

So far we have described the modeled version of the sound system of the target language (i.e, the acoustic model), the vocabulary and grammar of the language (i.e, the language model), and the pronunciation of the words in the language models (i.e., the pronunciation dictionary). The final component, often referred to as the scoring model, uses features generated by the previously described systems to give a score. This score-generation algorithm "learns" how to score pronunciation like expert human judges by examining expert ratings and maximizing predictions of those ratings by iterative combinations of features and weights. The scoring model may be the method for selecting features from the speech recognition process and applying them to predict human ratings. Training and implementing a scoring model has several steps. First, the test developers need to select a relevant set of features for human scoring of pronunciation, such as those measuring sounds, stress, or intonation; examples of these features are given in the section of state of the art in pronunciation scoring. Second, the developers need to select relevant statistical models which will best handle the complex data to predict human scores; examples of such models are linear regression, neural networks, or support vector machine regression—describing these is beyond the scope of this paper.

The fundamental point here is that the features analyzed in these models are often drawn from the differences between the properties of a learner's speech and the properties of a reference set of speech provided by proficient speakers of the language. In other words, a reference set of speakers exemplifies "acceptable" pronunciation, and then learner speech is compared with that. The resulting statistical differences between "acceptable" pronunciation and learner pronunciation can be used to predict human evaluations of pronunciation proficiency. However, this whole approach raises several questions. Who should be the reference set of "proficient" or "acceptable" speakers of English? And, who determines that they should be the reference set that everyone else is judged against?

Acoustic Models and Intelligibility

The acoustic model is not only the core component of the speech recognizer, but it also serves as a gateway for sending ASR results into the scoring models. Given this, it is critical to train the reference acoustic model with appropriate data. Put another way, the question that test developers should be asking themselves is "Whose pronunciation should we regard as the standard against which to compare learner speech?" Depending on the answer to this question, the speech data that test developers should collect for training the acoustic model might vary. Clearly, the answer to this question depends on the purpose of the assessment and the intended use and interpretation of the test score. In this section, this question is explored and assumes that English is the target language.

Many second language acquisition studies contend that aspiring to a native-like accent is not a realistic goal for most learners, and that most adults learners who study a foreign language after puberty will naturally have a foreign accent. Because English is a global lingua franca among people who have another first language, a widely accepted goal is for learners to achieve good intelligibility rather than a native-like accent. This view may be key to pronunciation assessment as well.

Whereas this view has an intuitive appeal in the context of English as an International Language, it has potential issues. For example, intelligibility as "hearer-based" may be a property of the listener as much as it is of the speaker. Exemplifying the classical concern of "intelligible to whom," there are studies in which two learner groups, Japanese and Chinese, were administered a listening test in English where questions were recorded by L1 speakers of Japanese and Chinese. The differential item functioning (DIF) analyses showed that Chinese test-takers were advantaged on the items recorded by the Chinese L1 speaker, suggesting that the listener's familiarity with the accent may help the listener better understand the L2 speech. Therefore, intelligibility may be considered a product of the co-constructed interaction between the speaker's pronunciation quality and the listener's experience or familiarity with the speaker's accent or speaking patterns. This concern translates into a practical challenge for pronunciation assessment in terms of how to operationalize this "in-the-ear-of-the-listener" construct.

Fortunately, in the context of automated evaluation, these issues can at least partially be overcome by developing the most appropriate acoustic model from the speech of a pool of reference speakers, who have been judged by many listeners as having the desired speech characteristics. Two example cases are discussed here. In the first case, suppose that test developers wanted to develop an assessment system for evaluating the pronunciation quality of Indian English speakers. The target test population is Indian speakers of English, and the purpose of the test is to assess the degree of the speaker's intelligibility to fellow Indian English listeners. This is a reasonable proposition, since much business in India is transacted in English, and people need to be able to understand one another. Who should the test developers choose as a reference model? In a case like this, the acoustic model should be built based on speech samples from a group of Indian English speakers; however, not all or any Indian English speakers could be qualified for the reference model. Even among Indian English speakers, there are speakers regarded as intelligible or less intelligible. Making a decision about which speakers are intelligible or not based on a single listener-judge is clearly not the right approach, as it depends too much on that listener's familiarity with the accents or past experiences. One solution is to recruit a panel of judges to "qualify" which speakers are most intelligible so as to be included in the reference acoustic model. Nevertheless, the question still remains as to how the panel makes its decision; at some point, test developers must decide on a criterion and justify it.

In another example, imagine test developers want to evaluate pronunciation quality of English learners globally. There might be many ways to develop a reference acoustic model in this case, depending on the definition or purpose of the test. One possible approach—an extreme one—may be to state that the target model for English is received pronunciation (RP) from England, and build a reference model using only speakers of this narrow variety of English. While this would be possible, it is contrary to the view of English as a lingua franca. Another possible approach may be to say that the target model is any standard speech from English speaking countries such as U.S., Canada, U.K., and Australia. Here, a reference model could be trained with spoken responses from a variety of English speakers who grew up in those four countries. A potential problem with this approach is that these countries contain very strong local and regional accents, and not all regional pronunciations are equally intelligible to native English speakers of other varieties, even within that country. The test developers may have to convene a panel of judges to decide whose speech is intelligible to a range of listeners, and perhaps only "standard" or "soft" accents from these four countries would be included in the reference model. A third approach could be an even more inclusive one—instead of using native English speakers' speaking patterns as a model, develop a reference model around highly intelligible L2 learners. This model would be able to incorporate a wide range of global accents, perhaps with the criteria that speakers should exhibit "widespread intelligibility and easy comprehensibility," rather than a native speaker accent associated with colonialism.

From these examples, it should be clear that the test designers' choices influence how pronunciation is evaluated, far more than the ASR software itself. There is, however, one caveat. Because the scoring models depend on statistical differences between learner speech and the reference speech, the reference speech has to be well-defined and sufficiently distinct from the learner speech. The reference speech has parameters within which it is expected that certain sounds are "acceptable"; for example, the articulation of /d/ should fit within certain bounds—if the tongue reaches too far back onto the soft palate, or too far forward against the teeth, then the sound of this consonant will fall outside of the bounds set by the reference speakers, and the unusual nature of this /d/ sound could therefore contribute to a low pronunciation score. (In this context, "pronunciation scores" are defined as "accuracy of pronunciation [segmentals, stress, intonation] relative to the reference model"). But if the reference model is overly inclusive of all accents, then all kinds of pronunciations would be deemed as acceptable, the "parameters of acceptability" for sound accuracy would be too wide, and the automated scoring would ultimately be unable to detect differences between the reference speech and learner speech.

From a software modeling point of view, the first option of having just one variety English as the reference would be the easiest computational way to discriminate very accurately among learners who have that pronunciation and those who do not. But as more accents and pronunciations are included in the reference model, it becomes more ambiguous and poorer at discriminating among learners. Thus, if the third and most inclusive option were selected, then intelligibility as a construct would have to be tightly defined (and it would again raise the question, "intelligible to whom?").

From this discussion, it should be clear that the purpose of the assessment and definition of the pronunciation construct, as well as the inferences and interpretation of the scores to be drawn from the assessment, should drive the decision of what reference model would be appropriate for a particular assessment system.

Other ASR Technology Considerations

In addition to defining the appropriate reference acoustic model, there are two other important distinctions for automatic pronunciation evaluation. These are (a) whether the system is speaker dependent or speaker independent, and (b) whether the speech is constrained or unconstrained. Speaker dependent systems are commonly used for dictation software. They work by learning the unique characteristics and speech style of an individual's voice. The speaker usually has to read a few pages of text in order to "train" the software on their voice. Speaker independent systems have typically been used in customer service telephone applications, but are now ubiquitous in smartphones and for giving instructions to your car or personal gadgets. They are designed to recognize anybody's voice, and so are generally less accurate than speaker dependent systems. Currently, all automated language assessments that we know of use speaker independent systems.

Concerning constrained versus unconstrained speech, constrained speech implies that we know what words the speaker might be attempting to say. For example, the speaker is reading aloud a passage or repeating a sentence that was given to him or her. Here, the speech processor's job is easier because it has an approximate idea of what the speaker will say and how they should say it. On the other hand, unconstrained (or spontaneous) speech refers to any speech or topic that a speaker might say or ask. In test tasks, speech is most often partially constrained, for instance, describing a picture or discussing a specific topic; we can anticipate the kinds of words that speakers might use to describe objects in the picture, but some word choices will vary from speaker to speaker.

This distinction is important because, for automated systems, the more constrained the speech is, the more accurate the evaluation of pronunciation can be. For human listeners evaluating the pronunciation of a speaker, it matters very little which kind of speech they hear. Human listeners can draw on the background schema, understanding of the social context, and conduct top-down processing in order to figure out what the speaker might be trying to say. But automated scoring systems require a reference point or model for it to determine what is accurate or not.

For example, take the sentence: "Was Mark late again today?" With this known sequence of words, a speech recognition engineer can draw on a large corpus of speech data and develop a set of expected parameters for the frequencies, durations and energy fingerprints that should be associated with this particular set of phones. If a speaker deviates from these expected parameters, it likely means that their pronunciation would be considered poor by trained human raters. This is a relatively "easy" computational problem. If, on the other hand, the automatic system has to evaluate pronunciation from speech where the content is unknown, then the computational problem is much bigger; the system first has to determine which words were spoken (and it might get this wrong), and then evaluate the pronunciation accuracy of those words. In this case, speech recognition accuracy would be confounded with pronunciation accuracy. For instance, the speaker intended to say "Mark" and the automatic system had no idea of the speaker's intent but recognized the word as "muck," then it might (incorrectly) evaluate the speaker's pronunciation of the word "muck." This is important for an assessment system like Pearson's Versant test because it purports to evaluate pronunciation accuracy, which, as noted above, is relative to a reference model, and returns a stand-alone pronunciation score to the users. It may not be as important in other systems such as ETS' SpeechRater if they evaluate a broader construct such as "delivery", in which pronunciation accuracy only comprises a part of what is evaluated (Xi, this volume). For this reason, the Versant system depends heavily on constrained tasks to reduce confounding factors for reliable and accurate pronunciation assessment.

Pronunciation Scoring

As discussed elsewhere, pronunciation is normally considered to consist of segmental features and suprasegmental features. Segmental features refer to sounds, such as consonants and vowels. Suprasegmental features include aspects of speech such as intonation, word and syllable stress, rhythm and sentence-level stress, and speed. In this section we will look at how automated systems can evaluate three main sub-constructs of pronunciation: sounds, word and sentence stress, and intonation. The section also discusses articulation rate and the extent to which his should be considered as pronunciation or fluency.

In automatic evaluation of pronunciation, human raters first listen to recordings of speech and assign pronunciation scores to them. Then, the software enables extraction of different features which can be used to evaluate pronunciation (by comparing learner speech with reference speech, as discussed above). Finally, a model curator decides which features to combine in order to match, or predict what scores human listeners would assign. So, what are the features that predict pronunciation, and how are they combined in models? Several such features are discussed.

Spectral Match Scores

These are the most direct and effective features to evaluate the sounds of pronunciation. An example of a spectral match score is phoneme segmentation acoustic likelihood based on a native acoustic model. In other words: how closely do the learner's consonants and vowels match the consonants and vowels of a collection of proficient speakers? Put another way, if we take a sample of speakers from our reference model, they will all exhibit varied speech patterns but we can use their utterances to create parameters for what is "normal" or "acceptable" for each sound in the language. If the learners' vowels and consonants fit within these parameters, they will exhibit a similar accent and level of intelligibility as the reference speakers. A characteristic of phonemes is that they change according to context, depending on the sounds that precede and follow them. Thus, rather than reference a general model of how native-speakers produce a word-initial /r/, more accurate results can be obtained on constrained, context-dependent speech such as read alouds.

It is a common misperception that automated scoring systems are limited to evaluating pronunciation accuracy of vowels and consonants without reference to their importance in comprehensibility. In fact, not all segments need be treated equally, and particular segments can be weighted more if they have a greater impact on intelligibility. Thus, if prediction models reveal that certain sounds—such as /w/, /r/, or /i/—have larger discrimination power in human evaluations of pronunciation, then spectral match scores for these sounds can be treated more importantly (i.e. weighted more in the scoring models) than sounds that have less discrimination. In this way, automatic systems can be trained to behave more like human listeners, who find that certain sounds degrade a speaker's intelligibility more than others.

This approach may be taken for a system to evaluate the accentedness of Indian speakers of English. A set of phonemes that are known to potentially affect intelligibility of Indian speakers, such as /v/, /w/, /t/, /d/, /s/, /z/, /l/ and /r/. They collected expert judgements of "Indian accentedness" over a sample of speakers. Raters applied a 5-point rating scale (5=heavy Indian accent; 1=no trace of Indian accent) and achieved inter-rater reliability of 0.84. The researchers then checked which phoneme segmentation statistics best predicted those human ratings. This analysis found that a set of all English vowel phonemes as a predictor variable correlated with the human ratings at 0.42; all English consonant phonemes together correlated at 0.63; but by isolating the set of Indian accent phonemes and using those only, the machine-human agreement was estimated to be highest, with a correlation of 0.83. All phonemes together, unweighted, correlated at 0.55, showing that the weaker discrimination power of many vowels brought down the overall predictive power of the Indian accent phonemes.

In a final model, a correlation of 0.84 was achieved between human and machine scores using less than three sentences read aloud by each participant. For comparison, the Versant test system predicts machine scores with correlations of 0.85-0.91 for general pronunciation, even in different languages such as English, French, and Chinese (Pearson, 2011a, 2011b, 2014).

This data robustly support the notion that certain consonant errors have a higher "functional load" than others, thereby impacting comprehensibility to a greater extent. There are two further interesting aspects to this study. First, the location of the Indian English phonemes, either in their sentence context or in their position in each word, was not closely studied; the impact of the phonemes as described here was evident regardless of context or within-word placement. However, it is possible that larger effects could be found if these factors were investigated further. Second, this study relied almost entirely on analysis of segmentals. Suprasegmentals and other features typical for evaluating pronunciation, such as prosodic features and phoneme duration, were also explored in their model but were found to have barely any discrimination power at all. Thus, the study suggests that Indian accentedness is largely characterised by consonant sounds. Suprasegmentals will be discussed next.

Fundamental Frequency and Energy

Prosody is used by speakers to convey information (questions or statements) and emotions (surprise or anger) as well as contextual clues (whether the speaker is conveying new or known information). Prosody normally refers to patterns of intonation, stress, and pausing. In speech processing, the measurable aspects of speech underlying these traits are fundamental frequency, energy, and duration statistics. Considerable research has been undertaken on automatic evaluation of prosody and intonation, but much of it is reference independent, such that an irrelevant utterance could produce a good score. Here, we will look at research conducted on the Read Aloud tasks of PTE Academic, which required learners' responses to be on task.

Fundamental Frequency (abbreviated to F-zero, or F0) refers to the speaker's pitch patterns, while energy refers to the placement of speech energy (e.g., for emphasis) in a word. Contours can be drawn to plot out rising or falling pitch and energy onset in word sequences. For example, saying a word or sentence with rising intonation would be illustrated by a rising line, or contour, on the plot. Similarly, saying a word with greater stress, or energy, is also illustrated by a rising contour on the plot. These plots simply help visualize the pattern of pitch or energy, and show how they change over the utterance, and how strong or weak they are over the course of the utterance.

These features of speech are visualized in FIG. 1, which shows the contours for F0 (upper four plots) and energy (lower four plots) for speakers saying the word "strategy." The two far lefthand plots show the F0 and energy contours for 20 different people pronouncing this word. Because there is variation in how proficient speakers say this word with different emphasis, there are many different contour patterns; neither the upper or lower plot depicts a single utterance pattern common to all these speakers. However, when the patterns are grouped according to similarity using a cluster analysis, it was found that most of these 20 people say "strategy" in this context in one of three different ways (upper and lower, three plots on the right). For example, some speakers have a rising tone that stays high (upper row, second from the right), while others have a rising tone that then falls towards the end of the word (upper row, right). This is important because it demonstrates that, although words and sentences can be appropriately pronounced in a variety of ways and with different expression, there are in fact usually only a limited number of variations that make sense in context, and these can be mapped and identified from the speech of just a handful of speakers.

Word-level analyses may be used such as these to attempt to explain intonation scores assigned by human raters. A rating scale was developed which evaluated prosody, defined as the extent to which speakers expressed an understanding of the meaning of a text through tone and emphasis. Raters applied a 5-point scale (5=prosody conveys meaning clearly; 1=no discernable prosodic patterns) to a sample of speakers, and attained inter-rater reliability of 0.75 on their prosody ratings. Both F0 and energy were found to correlate with the average of these human ratings at 0.67, which shows they are moderately good predictors. When combined together in a regression model, they predicted human ratings at 0.75. Cheng's research results are promising and show that there might be a set of automatically scored variables that would be predictive enough to incorporate in an automatically scored, high-stakes English assessment such as PTE Academic. Although suprasegmental features of speech such as prosody are seldom evaluated outside of research studies, they might be good candidates to round out the construct of L2 speaking proficiency because they have been found to be important to listeners (Kang, Rubin and Pickering, 2010).

One additional finding of this research was that when segmental duration of phones, associated with pausing and stress (see below), were added into the prediction model, the prediction improved. In fact, segmental duration was found to be an even better predictor than either F0 or energy, correlating with Using speech processing technology in assessing pronunciation—10 human ratings at 0.76. When statistics for F0, energy, and segmental duration were all included as predictors in a regression model, the correlation with human ratings increased to 0.80.

Duration Features

Duration statistics such as the articulation time for a segment or intra- and inter-word silences are features of word stress and rhythm. Similar to spectral match scores described above, the duration values in a learner's speech can be compared to the parameters of duration values derived from a collection of proficient reference speech; the resulting differences are used to predict pronunciation scores assigned by human raters. For example, for how many milliseconds do proficient speakers usually pause at a particular comma or phrase boundary? It may typically be 300 milliseconds, with a standard deviation of 100 milliseconds. If the learner pauses for a length of time outside these parameters, it may indicate that this learner is not speaking with the same expression-of meaning as the reference speakers. This is a much more sophisticated approach than simply measuring aspects of speech rate, such as the number of syllables articulated per minute or the mean length of runs, because the placement and location of pauses is taken into account. Thus, on average a proficient speaker and a learner might talk at the same rate, but the proficient speaker pauses for breath and emphasizes syllables in all the right places to indicate expressive meaning and prosody.

For articulated segments of speech (rather than periods of silence), durational measures are actually closely related to F0 and energy. When syllables are stretched or elongated, it is usually the case that the speaker is emphasizing that syllable, and at the same time the syllable is emphasized with changing pitch and/or energy. Thus, lengthening of segmental duration tends to co-occur with changing pitch and energy. It is therefore not surprising that segmental duration is equally as useful as pitch and stress for predicting human prosody ratings, as described above.

One might ask why the contours seem to show that all 20 speakers appear to articulate the word "strategy" over exactly the same length of time (x-axis). In fact, they all said the word at different articulation rates, but these plots have been normalized in order to take out the effects of articulation rate, and just focus on the effects of pitch and energy. Thus, the x-axis shows 25 equivalent distance points; each speaker's utterance was divided into 25 timeframes, and the timeframes one through twenty-five were lined up together for all the utterances. For example, at timeframe point 10, each speaker was "ten twenty-fifths" of the way through their utterance. Normalizing the utterances allowed the researcher to disaggregate the extent to which F0, energy, and segmental duration each predict prosody.

When applying duration statistics, the test developer should consider the constructs being assessed because duration measures relate to both pronunciation and fluency. For example, in the Versant Tests pronunciation and fluency are evaluated and reported as separate traits. In this case, features such as articulation rate, mean length of run, and appropriate pausing at phrase boundaries, may be defined as fluency rather than pronunciation. This provides useful feedback to the test-taker about the different aspects of their speaking proficiency, as reported scores distinguish between pronunciation accuracy and fluency. But if the construct being measured and reported is a more holistic construct such as "delivery" or "intelligibility," then all of the features discussed thus far could be combined and weighted in a model to predict human ratings.

This section has demonstrated how different features extracted from speech processors can be used to discretely measure different sub-constructs of pronunciation, such as sound-accuracy, accent, intonation, stress, and rhythm. In all cases, a well-defined and well-selected reference model of speakers is needed, so that learner performances can be compared to that model. The next section explores future areas of development for these approaches and technologies.

Other Improvements

It is likely that innovations in this space will continue to be driven by new modeling techniques, such as deep neural networks, combined with access to vast datasets and ever-increasing computing processing power. Areas where more improvements are needed include the ability to score pronunciation ability on unconstrained, spontaneous speech, versus the read aloud or constrained speech that has been much of the focus of this paper. Another such area involves improving speech recognition and pronunciation scoring under noisy conditions. Noisy environments provide a great challenge to ASR systems due to the interference that ambient noise brings to the recognition results; unfortunately, language proficiency exams are often actually administered in rooms with background noise or speech. Irrelevant and unrelated speech from the background could lead to spurious scoring. Thus, so-called "noise robust" speech recognition is needed.

Some of the remaining challenges for language testers who want to operationalize pronunciation scoring concern the reconciling of a subjective listener-based intelligibility construct with the goal of providing objective and reliable measurement of pronunciation. Here again, the implementation of the ASR technology may provide a solution. Some exploratory ideas are discussed here which may be costly to realize in practice, but which illustrate the potential of the technology.

Because a speaker's intelligibility is partly based on the listener's familiarity with that accent type, a pronunciation scoring system could be built based on judgments from groups of listeners with different L1 backgrounds. Imagine an individual logging into the computerized system as a learner of English whose L1 is Mandarin Chinese, and selecting to be evaluated by German listeners, in order to obtain his or her degree of intelligibility to the average German L1 listener. The same individual could also select a group of Brazilian or South African listeners, and find out how intelligible his or her speech is to an average Brazilian or South African. The system could even show a world map and color code the countries where the speaker has reached the level, for instance, that 75% of his or her speech could consistently be understood by the listener group of the country. This, of course, could be achieved by following the test development logic outlined in the section of Current methods and considerations, where panels of judges of one particular L1 (e.g., German) would rate other specific L1s (e.g., Chinese) for intelligibility. The automated models would then be trained to predict the behavior of those judges.

Other listener variables such as the degree of familiarity with particular L1 backgrounds, their level of English proficiency, whether they are expert raters or naive listeners, job type (e.g., school student or working professional) could be added to the selection process of the target listener base.

Another interesting possibility would be to produce separate scores for the three dimensions of pronunciation—intelligibility, comprehensibility, and accentedness. Given that these dimensions are somewhat related but are conceptualized as separate traits, it may be possible to develop a unique scoring system for each of these traits, with an automated system returning a score for each of them separately at the end of a series of tasks. It may even be possible to combine this idea with the "listener-base intelligibility assessment" described above in one single system, so that L2 speakers could get a more comprehensive evaluation of their pronunciation quality in relation to the global audience versus the specific audience types that they interact with most in their professional or personal lives. This feedback may help learners target their accent remediation towards the listener groups most important to them.

Taking this line of thought further, future ASR-based pronunciation systems may be able to select an individual target speaker (e.g., the student's classroom teacher, or a favorite movie star) and gain insights into how the learner's pronunciation is different from that of the target speaker of his/her choice. An ASR-based pronunciation tutor might be able to give specific feedback on articulatory or phonological differences at the phoneme level. This approach is already being researched.

Finally, this paper began by distinguishing between CAPT pronunciation remediation systems and ASR pronunciation assessment systems.

As scoring models improve, there is opportunity to close the gap between these two, and provide assessment systems accurate and sophisticated enough to also provide personalized remediation opportunities or advice. Such systems would be of great utility to the L2 assessment and learner community.

Typically, second language (L2) speech is evaluated on two aspects of performance: accuracy and relevancy of the content of a response and the manner in which such response is expressed and delivered. On assessments for the manner of speaking, common metrics for scoring are: (1) pronunciation, (2) fluency, and (3) intonation. But the construct of L2 speaking can be further enriched with three additional measurable dimensions. These are (1) comprehensibility, (2) accentedness, and (3) intelligibility. There has been a great deal of research conducted to tease apart factors that influence a language learner's speaking quality and they are found to each independently contribute to a language learner's overall L2 speech quality.

Native-like pronunciation and fluency are traditionally considered important and necessary for successful communication in a second language. But, researchers in the field of second language learning contend that L2 speakers can be effective even with accent as long as their speech is intelligible and comprehensible, and that should be the focus of assessment and instruction. The language assessment field can be enriched by providing independent scores for (1) comprehensibility, (2) accentedness, and (3) intelligibility. To reliably distinguish these inter-related dimensions, what is needed is an adaptable, machine learning process that will use the three additional factors to more accurately score spoken language and to refine and automate the language proficiency scoring process.

Figure 3:
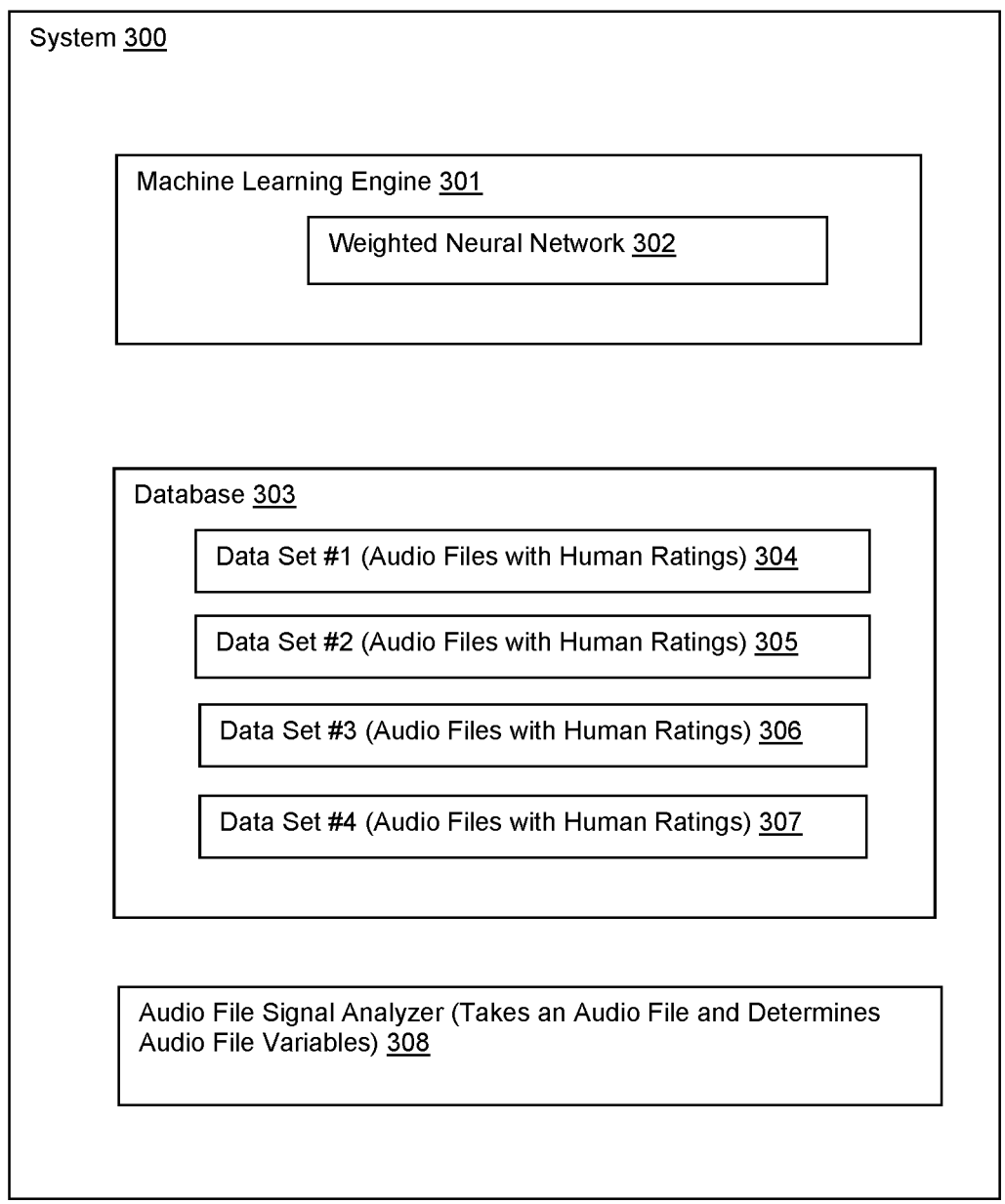
FIG. 3 illustrates a system with a machine learning engine comprising a weighted neural network and a database with training data, wherein the training data is grouped with data sets for different languages. This allows the machine learning engine to be trained on and then configured to evaluate the different languages.

Referring to FIG. 3, a system 300 for practicing the invention may comprise a machine learning engine 301, wherein the machine learning engine 301 further comprises a weighted neural network 302. The machine learning engine 301 needs to be trained to properly analyze audio files and determine various scores, such as, at least, a comprehensibility score 507, an accentedness score 508 and an intelligibility score 509.

The comprehensibility score 507 is hereby defined to be based on how well listeners would understand an audio file comprising at least one spoken sentence from the user in an evaluated language and/or the degree of easiness or difficulty with the recognition of a meaning attached to the at least one spoken sentence.

The accentedness score 508 is hereby defined to be based on one or more emphasis given to particular syllables or to particular words in the audio file and/or the listener' judgments on the degree of foreign accent when a second language speaker speaks the target language. Foreign accent may be influenced by the phonological characteristics of the speaker's native (first) language.

The intelligibility score 509 is hereby defined to be based on how many words listeners would recognize in the at least one spoken sentence in the audio file. This may be expressed as an absolute number, a percentage of words recognized verses a total number of words or a normalized number along any desired scale.

Of course, other scores may also be determined for the audio file. As non-limiting examples, the machine learning engine 301 may also determine an accuracy score and a relevancy score of the content of the at least one sentence in the audio file and/or the manner in which such at least one sentence is expressed and delivered. In some embodiments, the manner in which such at least one sentence is expressed and delivered may be evaluated based on pronunciation, fluency and intonation.

The system 300 may also comprise one or more databases 303. The database(s) 303 may store one or a plurality of different data sets 304, 305, 306 and 307. Each data set may comprise a plurality of related (at least be spoken in the same evaluation language) audio files and each audio file may have associated human ratings for any desired scores, such as, as non-limiting examples, a comprehensibility score 507, an accentedness score 508 and an intelligibility score 509 for that particular audio file. Thus, the plurality of audio files will have corresponding ratings determined by humans for each audio file.

All of the audio files in any given data set in the plurality of data sets 304, 305, 306 and 307 are for the same evaluated language. The audio files in different data sets 304, 305, 306 and 307 are for a different evaluated language. Thus, all of the audio files in a first data set 304 will be for the same first evaluated language, such as English, while all of the audio files in a second data set 305 will be for the same second evaluated language, such as Spanish. In some embodiments, the evaluated language may be further defined. As examples, there may be a data set for English as spoken in the United States, another data set for English as spoken in England, another data set for English as spoken in Canada and another data set for English as spoken in Australia. The data sets may even be broken down further from a country level to a state, region, city or any desired geographical area level.

In another embodiment, the data set may be broken down by listeners who are English as a second language teachers and listeners that are not English as a second language teachers. While this example used English as a second language teachers, other embodiments may include teachers of other languages as teachers of the evaluated language are typically better at understanding students than non-teachers of the evaluated language.

In another embodiment, the data set may be broken down according to the listeners being in a particular profession or industry, i.e., engineers, banking, etc. This would have the advantage of letting the speaker know how well the speaker would be understood by persons in that particular profession or industry.

The listeners who scored the audio files are preferably listeners that are considered, using whatever standards are desired, fluent in the evaluated language. In some embodiments, the audio files may be further grouped according to the native language of the listener who scored the audio file. Thus, a data set 304, 305, 306 or 307 may have only audio files with the evaluated language of English that are rated by listeners fluent in English, but where the listener has German as their native language.

Alternatively or in addition, the audio files may also be grouped in the data sets according to the native language of the speaker. Thus, there may be a data set that may be used to train the machine learning engine 301 on an evaluated language of English, by a listener who is fluent in English as spoken in New York, United States, but where the listener has a native language of Mandarin as spoken in Beijing, China. This particular data set may be used to inform a speaker as to how well the speaker, based on their audio file, would be understood in the city of New York, United States by someone fluent in English, but with a native language of Mandarin as spoken in Beijing, China. Thus, the invention provides a great deal of flexibility in evaluating how well a speaker would be understood by different groups of people in various locations of the world.

Additional training data sets 304, 305, 306 and 307, comprising audio files in an evaluated language and human ratings from humans proficient in the evaluated language, may be created and stored in the database 303.

An audio file signal analyzer 308 may be used to determine a plurality of audio file variables from an audio file. Any audio file variable desired may be used, such as any of the above described characteristics of speech.

Figure 4:
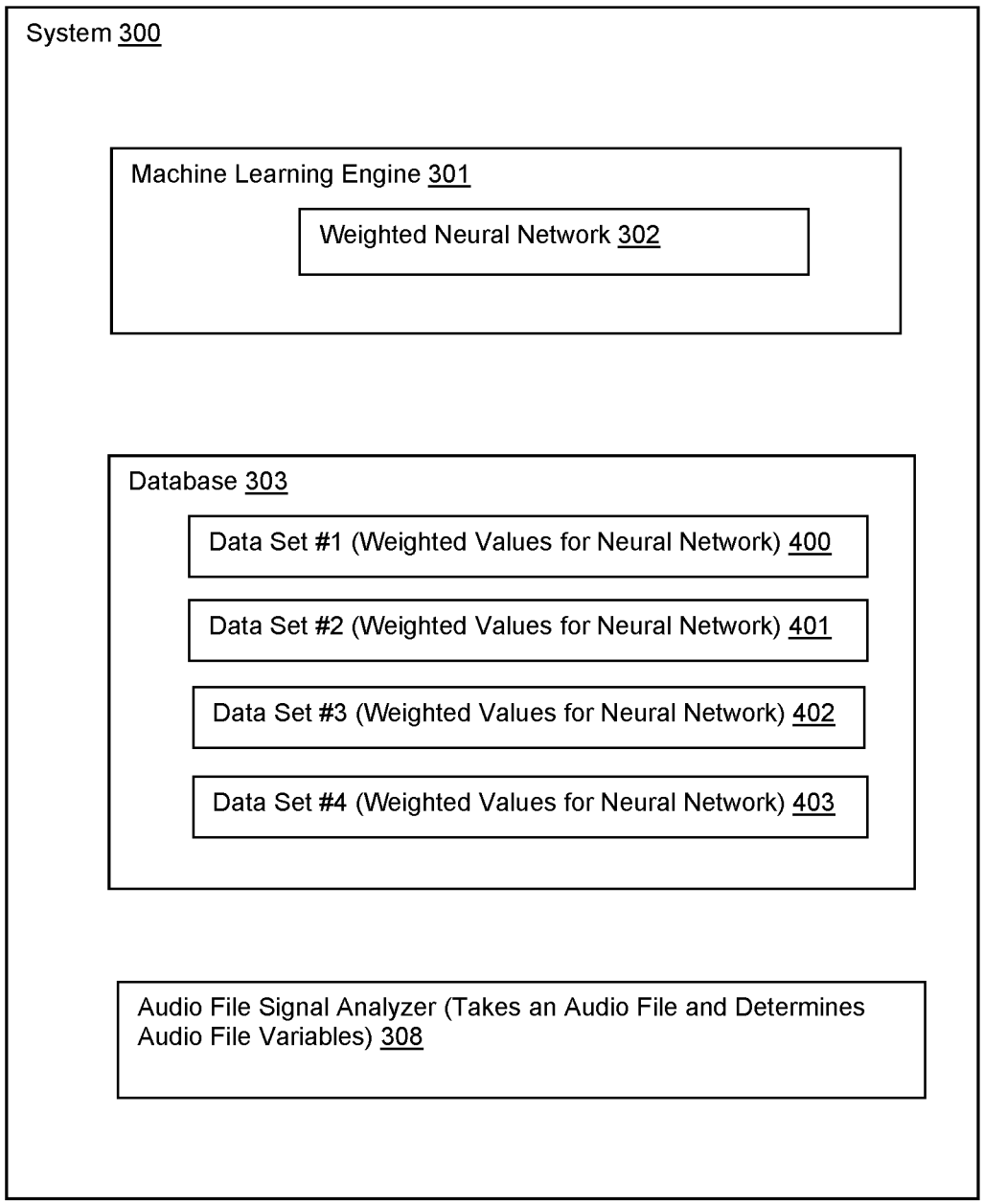
FIG. 4 illustrates a system after the machine learning engine has been trained using the training data illustrated in FIG. 3. After training the machine learning engine the weighted values for the neural network for each evaluated language may be stored in the database.
Figure 6:
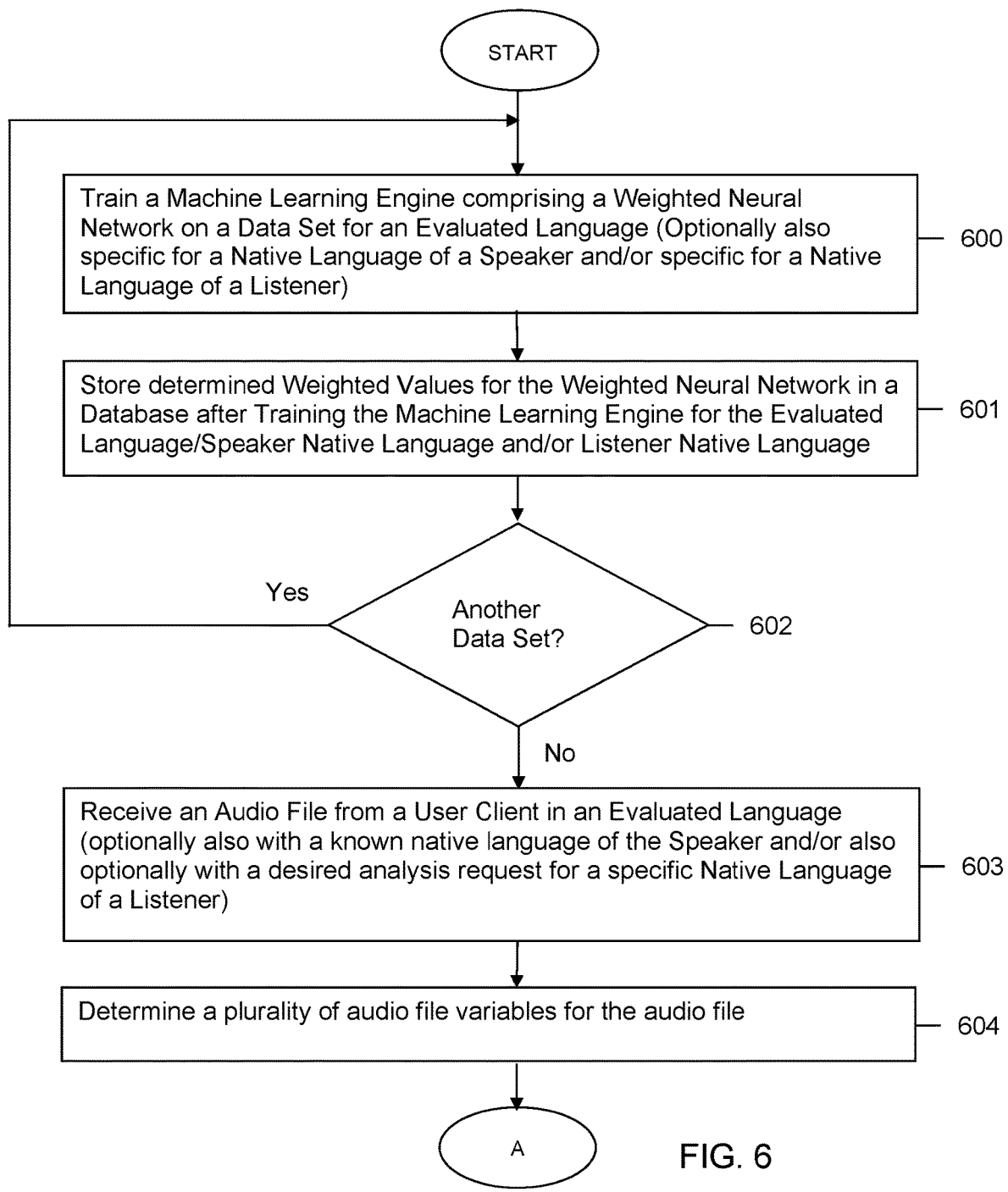
FIGS. 6 and 7 are flowcharts of a method of practicing the invention to determine a fluency of the user in the evaluated language.
Figure 7:
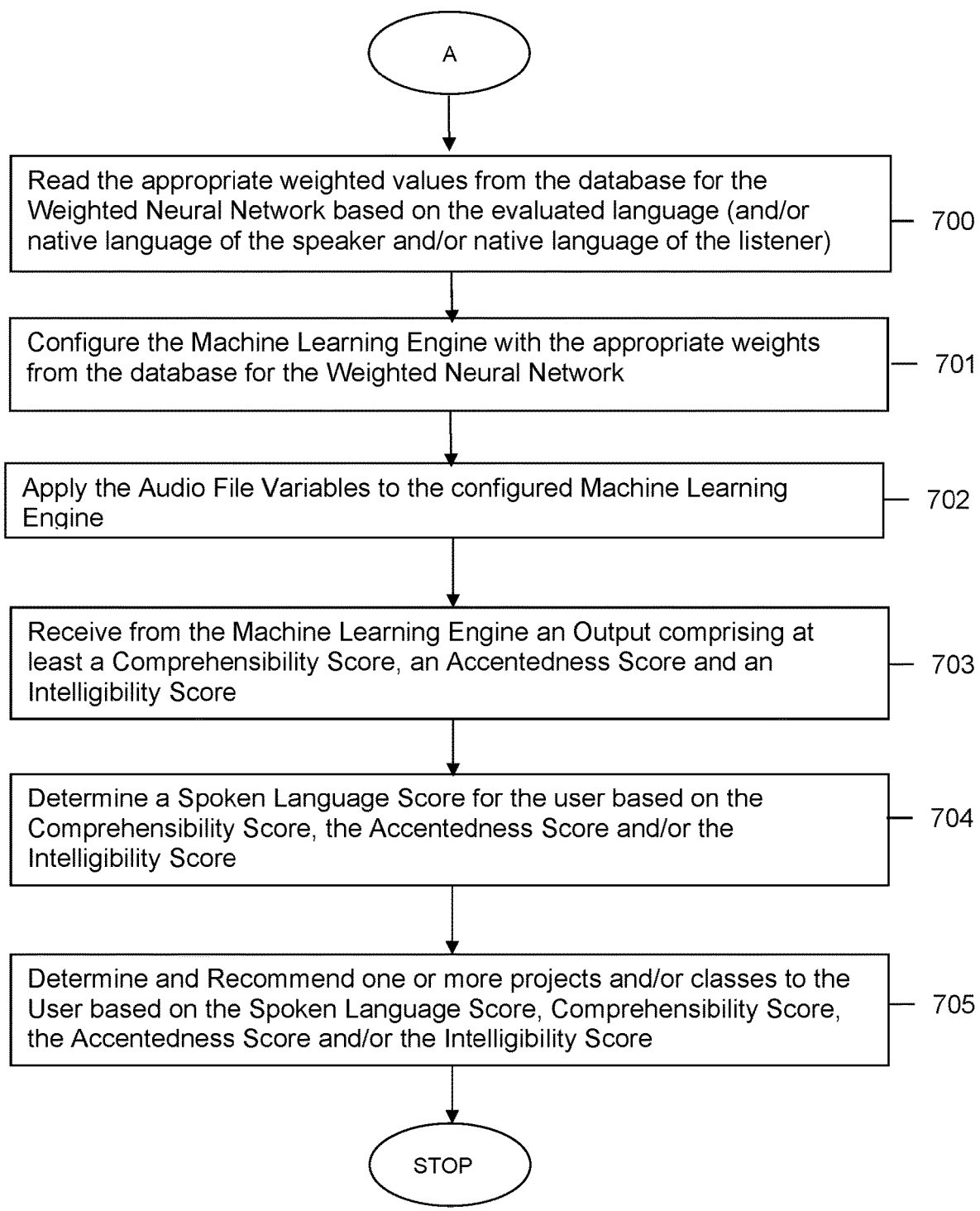

Referring to FIGS. 4, 6 and 7, each data set 400, 401, 402 and 403 in the database 303 may be used to train the machine learning engine 301 to determine a plurality of weighted values for the weighted neural network 302. (Step 600) Thus, a first data set 400 (comprising audio files/audio file variables and human rated scores for the audio files) for an evaluated language of English by listeners with a native language of English may be used to train the machine learning engine 301 to determine a first plurality of weighted values for the weighted neural network 302. The first plurality of weighted values may be saved in a database 303 and used by the machine learning engine 301 whenever an audio file is to be evaluated in English according to how native English language speakers (fluent in English) would rate the audio file. (Step 601)

In addition, a second data set 401 (comprising different audio files/audio file variables with different human rated scores for the audio files) for an evaluated language of Spanish by listeners with a native language of German may be used to train the machine learning engine 301 to determine a second plurality of weighted values for the weighted neural network 302. The second plurality of weighted values may be stored in the database 303 and used by the machine learning engine 301 whenever an audio file is to be evaluated in Spanish according to how German native language speakers (fluent in Spanish) would rate an audio file. (Step 602)

Additional weighted values for the weighted neural network 302 for other evaluated languages and/or native language of the listeners may be created and stored in the database 303.

Figure 5:
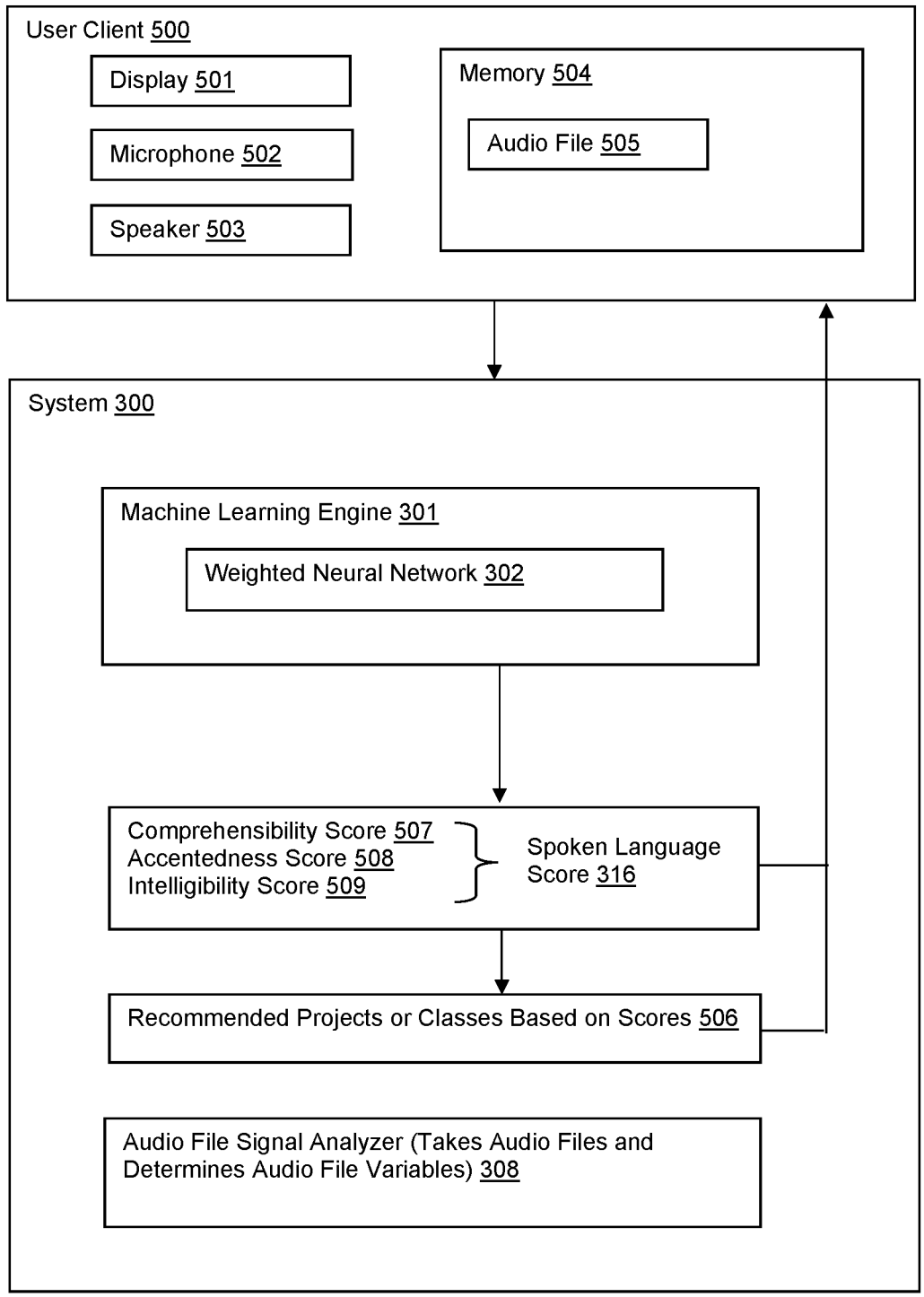
FIG. 5 illustrates a system with a user client that may create/record and then transmit an audio file to the system, wherein the system is then able to evaluate the audio file with the machine learning engine to determine a level of fluency of the user in the evaluated language.

Referring to FIG. 5, the invention may be used by a user using a user client 500. The user client 500 may be a cell phone, table, lap top, desk top computer or any other electronic device comprising a display 501, a microphone 502, a speaker 503 and a memory 504. The user may use the user client 500 to record, using the microphone 502, an audio file 505. The user client 500 may transmit the audio file 505, such as over the Internet, to the system 300 capable of practicing the current invention. (Step 603)

The system 300, having received the audio file 505 from the user client 500, may use an audio file signal analyzer 308 to determine a plurality of audio file variables for the audio file 505. As previously described, the audio file variables may be any desired characteristics of the audio file as desired. As non-limiting examples, the audio file variables may be any of the previously described characteristics of human speech. (Step 604)

The system 300 may also read from the database 303 (Step 700) and configure the weighted neural network 302 with the appropriate weighted values for the neural network 302 (Step 701). Thus, if the evaluated language in English, the weighted values created during training on the English audio files are used.

The system 300 may then apply the audio file variables for the audio file 505 received from the user client 500 to the machine learning engine 301 comprising the weighted neural network 302. (Step 702)

The machine learning engine 301 may then determine a comprehensibility score 507, an accentedness score 508 and an intelligibility score 509 for the audio file 505. The comprehensibility score 507 may be based on how well listeners would understand the at least one spoken sentence from the user in the evaluated language. The accentedness score 508 may be based on one or more emphasis given to particular syllables or to particular words in the audio file 505. The intelligibility score 509 may be based on how many words listeners would recognize in the at least one spoken sentence. (Step 703)

The system 300 may determine a spoken language score 510 for the user based on the comprehensibility score 507, the accentedness score 508 and the intelligibility score 509. The spoken language score 510 may represent a language proficiency of the user for the evaluated language based on the audio file 505. (Step 704)

The system 300 may determine one or more projects and/or one or more classes 506 the user may perform/take to improve the user's comprehensibility score 507, accentedness score 508, intelligibility score 509 or spoken language score 510. (Step 705)

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising at least one processor executing program code instructions on a server computer coupled to a network, the program code instructions causing the server computer to:
  receive from a user client an audio file comprising at least one spoken sentence in an evaluated language from a user;
  determine a plurality of audio file variables from the audio file;
  train a machine learning engine on a plurality of different data sets to create a plurality of corresponding weighted neural networks, wherein each data set comprises a plurality of audio files with each audio file having a comprehensibility score, an accentedness score and an intelligibility score and wherein each data set has a unique combination of a speaker native language, an evaluated language and a listener native language,
  apply the audio file variables to a machine learning engine comprising a weighted neural network;
  receive from the machine learning engine for the user:
    a comprehensibility score for the audio file, wherein the comprehensibility score is based on how well listeners would understand the at least one spoken sentence from the user in the evaluated language,
    an accentedness score for the audio file, wherein the accentedness score is based on one or more emphasis given to particular syllables or to particular words in the audio file, and
    an intelligibility score for the audio file, wherein the intelligibility score is based on how many words listeners would recognize in the at least one spoken sentence; and
  determine a spoken language score for the user based on the comprehensibility score, the accentedness score and the intelligibility score, wherein the spoken language score represents a language proficiency of the user for the evaluated language based on the audio file.

2. The system of claim 1,
  wherein the each data set has a unique combination of a speaker native language in a first country, an evaluated language in a second country and a listener native language in a third country.

3. The system of claim 2, wherein the first country, the second country and the third country are all different countries.

4. The system of claim 1, wherein the program code instructions further cause the server computer to:
  receive from the user on the user client a desired listener native language; and
  wherein the machine learning engine comprising the weighted neural network was trained using a speaker native language of the user, the evaluated language and the received desired listener native language.

5. The system of claim 2, wherein the program code instructions further cause the server computer to:
  receive from the user on the user client a desired listener native language in the third country; and
  wherein the machine learning engine comprising the weighted neural network was trained using a speaker native language of the user, the evaluated language of the second country and the received desired listener native language of the third country.

6. The system of claim 1, wherein the program code instructions further cause the server computer to:
  display a world map on the user client that color codes the countries where the user has reached a predetermined percentage of speech that could consistently be understood by listeners of the country in a first color and color codes the countries where the user has not reached the predetermined percentage of speech that could consistently be understood by listeners of the country in a second color.

7. A method for at least one processor executing program code instructions on a server computer coupled to a network, comprising the steps of:
receiving from a user client an audio file comprising at least one spoken sentence in an evaluated language from a user;
determining a plurality of audio file variables from the audio file;
training a machine learning engine on a plurality of different data sets to create a plurality of corresponding weighted neural networks, wherein each data set comprises a plurality of audio files with each audio file having a comprehensibility score, an accentedness score and an intelligibility score and wherein each data set has a unique combination of a speaker native language, an evaluated language and a listener native language;
applying the audio file variables to the machine learning engine comprising a weighted neural network;
receiving from the machine learning engine for the user:
a comprehensibility score for the audio file, wherein the comprehensibility score is based on how well listeners would understand the at least one spoken sentence from the user in the evaluated language,
an accentedness score for the audio file, wherein the accentedness score is based on one or more emphasis given to particular syllables or to particular words in the audio file, and
an intelligibility score for the audio file, wherein the intelligibility score is based on how many words listeners would recognize in the at least one spoken sentence; and
determining a spoken language score for the user based on the comprehensibility score, the accentedness score and the intelligibility score, wherein the spoken language score represents a language proficiency of the user for the evaluated language based on the audio file.

8. The method of claim 7, wherein training the machine learning engine includes training the machine learning engine on a plurality of different data sets to create a plurality of corresponding weighted neural networks, wherein each data set comprises a plurality of audio files with each audio file having a comprehensibility score, an accentedness score and an intelligibility score and wherein each data set has a unique combination of a speaker native language in a first country, an evaluated language in a second country and a listener native language in a third country.

9. The method of claim 8, wherein the first country, the second country and the third country are all different countries.

10. The method of claim 7, further comprising the steps of:
receiving from the user on the user client a desired listener native language; and
wherein the machine learning engine comprising the weighted neural network was trained using a speaker native language of the user, the evaluated language and the received desired listener native language.

11. The method of claim 8, wherein the program code instructions further cause the server computer to:
receive from the user on the user client a desired listener native language in the third country; and
wherein the machine learning engine comprising the weighted neural network was trained using a speaker native language of the user, the evaluated language of the second country and the received desired listener native language of the third country.

12. The method of claim 7, further comprising the step of:
display a world map on the user client that color codes the countries where the user has reached a predetermined percentage of speech that could consistently be understood by listeners of the country in a first color and color codes the countries where the user has not reached the predetermined percentage of speech that could consistently be understood by listeners of the country in a second color.

13. A method for at least one processor executing program code instructions on a server computer coupled to a network, comprising the steps of:
receiving during an online language class from a user client an audio file comprising at least one spoken sentence in an evaluated language from a user;
determining a plurality of audio file variables from the audio file;
training the machine learning engine on a plurality of different data sets to create a plurality of corresponding weighted neural networks, wherein each data set comprises a plurality of audio files with each audio file having a comprehensibility score, an accentedness score and an intelligibility score and wherein each data set has a unique combination of a speaker native language, an evaluated language and a listener native language;
applying the audio file variables to the machine learning engine comprising a weighted neural network;
receiving from the machine learning engine for the user:
a comprehensibility score for the audio file, wherein the comprehensibility score is based on how well listeners would understand the at least one spoken sentence from the user in the evaluated language,
an accentedness score for the audio file, wherein the accentedness score is based on one or more emphasis given to particular syllables or to particular words in the audio file, and
an intelligibility score for the audio file, wherein the intelligibility score is based on how many words listeners would recognize in the at least one spoken sentence;
selecting and then displaying one or more projects or classes on the user client that would be the most beneficial for the user to take, based on the comprehensibility score, the accentedness score and the intelligibility score for the user.

14. The method of claim 13, wherein training the machine learning engine includes training the machine learning engine on a plurality of different data sets to create a plurality of corresponding weighted neural networks, wherein each data set comprises a plurality of audio files with each audio file having a comprehensibility score, an accentedness score and an intelligibility score and wherein each data set has a unique combination of a speaker native language in a first country, an evaluated language in a second country and a listener native language in a third country.

15. The method of claim 14, wherein the first country, the second country and the third country are all different countries.

16. The method of claim 13, further comprising the steps of:
- receiving from the user on the user client a desired listener native language; and
- wherein the machine learning engine comprising the weighted neural network was trained using a speaker native language of the user, the evaluated language and the received desired listener native language.

17. The method of claim 14, wherein the program code instructions further cause the server computer to:
- receive from the user on the user client a desired listener native language in the third country; and
- wherein the machine learning engine comprising the weighted neural network was trained using a speaker native language of the user, the evaluated language of the second country and the received desired listener native language of the third country.

* * * * *